No. 865,248. PATENTED SEPT. 3, 1907.
W. JAMIESON.
LUBRICATOR.
APPLICATION FILED MAR. 4, 1907.
Fig. 1
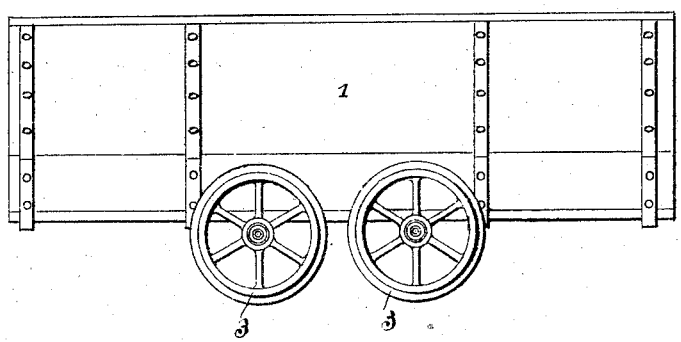
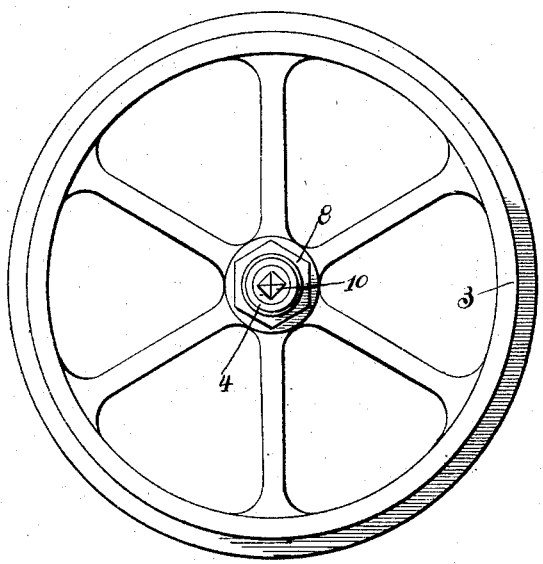
Fig. 2.
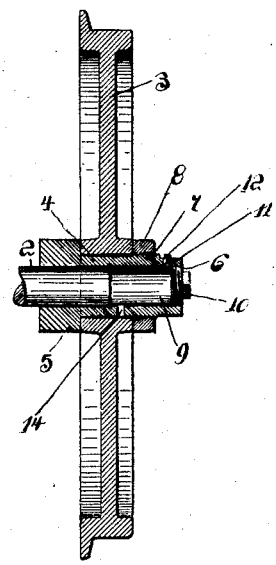
Fig. 3.
WITNESSES:
C. Klostermann.
R. H. Butler.
INVENTOR
W. Jamieson.
By H. C. Evert & Co.
Attorneys

UNITED STATES PATENT OFFICE.

WILLIAM JAMIESON, OF McDONALD, PENNSYLVANIA, ASSIGNOR OF ONE-THIRD TO AUGUST VALENTOUR AND ONE-THIRD TO WILLIAM JAMIESON, JR., OF McDONALD, PENNSYLVANIA.

LUBRICATOR.

No. 865,248.  Specification of Letters Patent.  Patented Sept. 3, 1907.

Application filed March 4, 1907. Serial No. 360,430.

*To all whom it may concern:*

Be it known that I, WILLIAM JAMIESON, a citizen of the United States of America, residing at McDonald, in the county of Washington and State of Pennsylvania, have invented certain new and useful Improvements in Lubricators, of which the following is a specification, reference being had therein to the accompanying drawing.

This invention relates to lubricators for mining and pit cars, and the invention has for its object to provide a novel hub for the wheels of a pit car, wherein a lubricant reservoir of improved construction is employed for thoroughly lubricating the wheels of the same. To this end, I have devised a novel hub or sleeve adapted to revolubly support a wheel upon the end of an axle mounted in said hub or sleeve, said hub or sleeve constituting a reservoir for a suitable lubricant which during the rotation of said wheel, is equally distributed to the bearing surfaces of said wheel.

My improved lubricator is particularly designed for mining cars, but it is obvious that the principle of my invention is applicable to various types of wheels which need thorough lubrication, in order to insure an easy and non-wearing movement of a car or other vehicle.

The detail construction entering into my invention will be hereinafter more fully described and then specifically pointed out in the appended claims, and referring to the drawing forming part of this specification, like numerals of reference designate corresponding parts throughout the several views, in which:—

Figure 1 is an elevation of a mining car equipped with my improved lubricator, Fig. 2 is an elevation of a wheel having a hub constructed in accordance with my invention, Fig. 3 is a vertical sectional view of the same.

In the accompanying drawing, I have illustrated a conventional form of mining car 1 which is supported by axles 2 and revoluble wheels 3.

My invention resides in providing the ends of the axles 2 with sleeves 4 having inner peripheral flanges 5, and interiorly threaded at the ends as shown at 6.

Upon the sleeves 4 the wheels 3 are adapted to revolve, and to retain said wheels thereon, I provide the sleeves 4 with exterior threads 7 to receive a collar or ring 8, said collar or ring retaining the revoluble wheels 3 upon the sleeves and against the inner flanges 5.

The sleeves 4 form a cylindrical compartment or reservoir 9 for a suitable lubricant, and in order to retain the lubricant within said reservoir or compartment, I provide the ends of the sleeves or hubs with screw threaded plugs 10. A lubricant is placed within the sleeves through a threaded opening 11 which is normally closed by a threaded plug 12, while the lubricant is discharged to the bearing surfaces of the hubs or sleeves through opening 14 which is normally closed by the inner surface of the hub of the wheel 3 when the wheels are at rest. I do not care to confine myself to the manner in which the sleeves are secured upon the ends of the axles 2, and it is obvious that the sleeves may be of various lengths to increase the capacity of the lubricant reservoir. With this arrangement it will be noted that the wheel 3 may be removed from the sleeve 4 without detaching the sleeve or interfering with the lubricant chamber 9, care being taken to see that the axle 2 and its detached sleeve 4 is positioned to bring the discharge aperture 14 uppermost so that the lubricant material will not be allowed to flow out and be lost.

In some instances the screw threaded plugs may be dispensed with, and in providing the sleeves 4, the outer ends of the same may be closed when forming said sleeves.

Such variations in the size, proportion and minor details of construction as are permissible by the appended claims, may be resorted to without departing from the spirit and scope of the invention.

What I claim and desire to secure by Letters Patent, is:—

1. The combination with an axle and a wheel, of a sleeve carried by said axle on which the wheel is mounted for rotation and extending in advance of the end of the axle and closed at the outer end, whereby a lubricant reservoir is formed within the sleeve in advance of the axle, said sleeve having a flanged inner end and an externally threaded outer end and a lateral lubricant aperture providing communication between said lubricant reservoir and the hub of the wheel, and a stop collar engaging the threaded end of the sleeve and retaining the wheel thereon, and means for supplying lubricant to said reservoir.

2. The combination with an axle and a wheel, of a sleeve carried by said axle and on which the wheel is mounted for rotation, said sleeve being flanged at the inner end and internally threaded at the outer end and externally threaded near the outer end, and extending in advance of the end of the axle to provide a lubricant reservoir within the sleeve and provided with a lateral lubricant aperture providing communication between said lubricant reservoir and the hub of the wheel, an internally threaded stop collar engaging the external threads of the sleeve and bearing against the wheel hub, a threaded plug engaging the internal threads of the sleeve to form a closure to said reservoir, and a threaded plug extending through said sleeve between said stop collar and threaded closure plug.

In testimony whereof I affix my signature in the presence of two witnesses.

WILLIAM JAMIESON.

Witnesses:
 PATRICK SMITH,
 STEPHEN JARRETT.